US007656459B2

(12) United States Patent
Catanzaro

(10) Patent No.: US 7,656,459 B2
(45) Date of Patent: Feb. 2, 2010

(54) CRANE HOOK AND TROLLEY CAMERA SYSTEM

(75) Inventor: Chris Catanzaro, Oahu, HI (US)

(73) Assignee: Pacific Systems Solution LLC, Honolulu, HI (US)

( * ) Notice: Subject to any disclaimer, the term of this patent is extended or adjusted under 35 U.S.C. 154(b) by 515 days.

(21) Appl. No.: 11/379,539

(22) Filed: Apr. 20, 2006

(65) Prior Publication Data

US 2007/0235404 A1 Oct. 11, 2007

(51) Int. Cl.
*H04N 5/225* (2006.01)
*H04N 7/18* (2006.01)
*B66C 17/00* (2006.01)
*B66C 19/00* (2006.01)

(52) U.S. Cl. ....................... 348/372; 348/143; 348/373; 212/312

(58) Field of Classification Search ................. 348/143, 348/144, 211.2, 211.11, 372, 373; 212/96, 212/104, 105
See application file for complete search history.

(56) References Cited

U.S. PATENT DOCUMENTS 3,881,608 A 5/1975 Hupkis
5,089,895 A 2/1992 Fraker
5,142,658 A * 8/1992 McMorran et al. .......... 382/104
5,731,974 A * 3/1998 Pietzsch et al. ............... 700/83
6,351,720 B1 2/2002 Hoshina
6,549,139 B2 * 4/2003 Shaw, Jr. .................... 340/685
6,671,520 B1 * 12/2003 Kim ........................ 455/556.1
6,744,372 B1 * 6/2004 Shaw et al. ................. 340/685
6,880,712 B2 4/2005 Uchida
6,894,621 B2 * 5/2005 Shaw ......................... 340/685
6,985,085 B1 1/2006 Brown
7,127,998 B2 * 10/2006 MacDonald et al. ........ 104/178
2002/0067425 A1 6/2002 Iverson
2003/0048376 A1 3/2003 Peeples
2004/0026348 A1 2/2004 Shaw
2004/0149056 A1 8/2004 Lucas
2005/0192732 A1 9/2005 Narisawa
2005/0232733 A1 10/2005 Maurer et al.

FOREIGN PATENT DOCUMENTS

JP 07137982 5/1995
JP 2002274779 9/2002

* cited by examiner

*Primary Examiner*—Sinh Tran
*Assistant Examiner*—Richard M Bemben
(74) *Attorney, Agent, or Firm*—Leighton K. Chong

(57) ABSTRACT

A crane camera system employs a hook camera transmitter to send wireless signals vertically upward to a trolley receiver, which are then relayed by a trolley transmitter to the operator cabin. This allows line-of-sight wireless transmission of signals from the hook to the cabin to take place reliably without interference from obstructions on the work site. It is especially suitable for a tower-type overhead or boom-type crane. A trolley camera may also be provided for taking look-down images of the hook and transmitting them to the cabin in tandem with the hook camera signals. The hook and trolley camera images allows the operator to see more precisely the positioning of the hook relative to the ground, thereby greatly reducing the possibility of accidents or damaging collisions with persons or objects on the ground. A hook assembly mounting the hook camera on the hook has a longitudinal frame fastened with vibration-dampeners to two lateral hook spindles in the hook to avoid reducing the integrity of the hook or contact with moving parts of the hook.

11 Claims, 6 Drawing Sheets

CRANE HOOK AND TROLLEY CAMERA SYSTEM

TECHNICAL FIELD

The invention subject matter is directed to a crane camera system and, particularly, a system which is adapted for use on a tower-type overhead crane to provide video images of the hook relative to the ground despite constant movement around obstructions at work sites.

BACKGROUND OF INVENTION

Various types of crane camera systems have been proposed to enable the crane operator to see conditions around the crane arm or around the load being worked by the crane. For example, U.S. Pat. Nos. 6,894,621 and 6,744,372, and U.S. Published Application 2004/0026348 disclose providing displays in the crane cab of videocam images from one or more cameras mounted on the trolley of an overhead crane and/or on the hook or hoist device, along with other safety sensors, such as for detecting wind gusts or the proximity of obstructions. U.S. Pat. No. 6,985,085 discloses providing a remote-controllable and steerable camera on the boom of a crane for imaging the vicinity of the load. U.S. Pat. No. 6,880,712 discloses look-down sensors on the trolley of an overhead-type crane for detecting the corners of a load. U.S. Pat. No. 3,881,608 teaches the use of sensors on a overhead crane boom to detect the trolley position. U.S. Pat. Nos. 6,894,621 and 6,351,720 and U.S. Published Applications 2005/0192732, 2005/0232733, 2004/0026348, and 2004/0149056 also disclose various systems of cameras or sensors provided on the trolley to detect the position of the load.

However, these prior systems have not provided for reliably transmitting video signals to the crane operator while working around various types of obstructions typically encountered on a work site. If the video signals are carried by a wire cable or optical fiber cable, then the range of motion of the moving video camera may be limited by the wired connection. If wireless transmission is used, then for high-frequency (MW) signals, line-of-sight transmission between the hook and the operator cabin must be maintained despite obstacles on the worksite and the constant motion of the hook to the operator cabin. If low-frequency (RF) signals are used, then the data rate that can be transmitted is reduced and/or the image resolution must be lowered, and signal transmission may deteriorated by obstructions on the work site.

SUMMARY OF INVENTION

In accordance with the present invention, a crane camera system, for use with a crane of the type having a boom elevated above the ground, a trolley on the boom from which a hook device is vertically suspended on cables, and an operator cabin located at a proximal part of the boom, comprising:

(a) a hook camera system mounted on the hook device including a hook camera for taking visual images of conditions in the vicinity of the hook device, and a hook camera image signal transmitter for wirelessly transmitting hook camera image signals in a vertical direction toward the trolley; and (b) a trolley camera system mounted on the trolley having a trolley receiver for receiving the hook camera image signals transmitted from the hook camera image signal transmitter, and a trolley transmitter for wirelessly transmitting the received hook camera image signals in a length-wise direction along the boom toward the operator cabin.

In a preferred embodiment of the invention, the crane camera system is used with a tower-type overhead crane having a horizontal boom elevated on a vertical tower assembly and provided with a movable trolley from which the hook device is suspended on cables. The trolley camera system is mounted on the trolley and also includes a trolley camera for taking look-down visual images of the hook device from the trolley, and a second trolley transmitter for transmitting trolley camera image signals toward the operator cabin in tandem with the relayed hook camera image signals.

The image signals of both the hook camera and the trolley camera can thus be transmitted by wireless line-of-sight transmission at high frequencies and/or for high image resolution to the operator cab despite the presence of obstacles and obstructions around the work site. With the invention system, the crane operator can see more precisely the positioning of the hook device toward the ground at the end of the cable hoist from the trolley, as well as conditions on the ground in the vicinity of the hook device, thereby greatly reducing the possibility of accidents or damaging collisions with persons or objects on the ground.

Other objects, features, and advantages of the present invention will be explained in the following detailed description of the invention having reference to the appended drawings.

DETAILED DESCRIPTION OF INVENTION

In the following detailed description, a preferred embodiment of the invention is described providing certain specific examples of their implementation. However, it will be recognized by those skilled in the art that other equivalent components, layouts, and functions may be substituted instead, and that other variations and modifications thereof may be made given the disclosed principles of the invention.

While it may be used on any type of crane that has a load hoisting device retractable on cables extending from a boom or arm of a crane, the invention is particularly suitable for use in an overhead or tower-type crane used in modern construction. The tower crane is a massive "T" shaped, lifting apparatus comprised of a tall vertical assembly topped with horizontal boom or jib containing a traversing horizontal trolley equipped with a hook at the end of suspension cables that is lowered and raised while the jib is moved over a range of 360 degrees to hoist a load picked up from and placed at another desired position on the ground. A 'pick', in this context, is the description of any of a number of types of material to be lifted by the crane hook. The human operator sits in an operator cab or cabin, often 1,000 feet above the work site at the apex of the intersection of the horizontal and vertical members of the crane and operates a system in an X-Y-Z plane of hoisting.

As such, the operator lacks the vision of the pick for a number of reasons including but not limited to weather, distance and obstacles. Heretofore, the operator lacked 'eyes' to see with precision the positioning of the hoist device and load around and onto the ground, and the conditions on the ground in the vicinity where the load is picked from or placed onto. For years, the safety and productivity of the operator has depended upon voice communications with a rigger, who loads the pick and instructs the operator when, where and what to pick.

As used herein, certain terms known in the art are used herein having the following meanings:

Hook: a mobile component of a crane that can be lowered and raised from the trolley carriage. It can be maneuvered to specific locations around the construction site where loads are attached to or removed therefrom.

Cheek Plates: steel metal plates on either side of the hook.

Cabin: location of a housing for the crane operator.

Trolley Carriage (Trolley): is a movable mechanism attached to move along the crane boom parallel to the ground. The trolley typically has wheels that move on a track along the top of the crane boom.

Crane Boom (Boom): long steel structure extending horizontally parallel to the ground. It can swivel 360 degrees for moving the trolley and hook to any desired location on the ground.

Trolley Maintenance Basket: a one-man basket anchored to the side of the trolley carriage which moves with the trolley.

Figure 4:
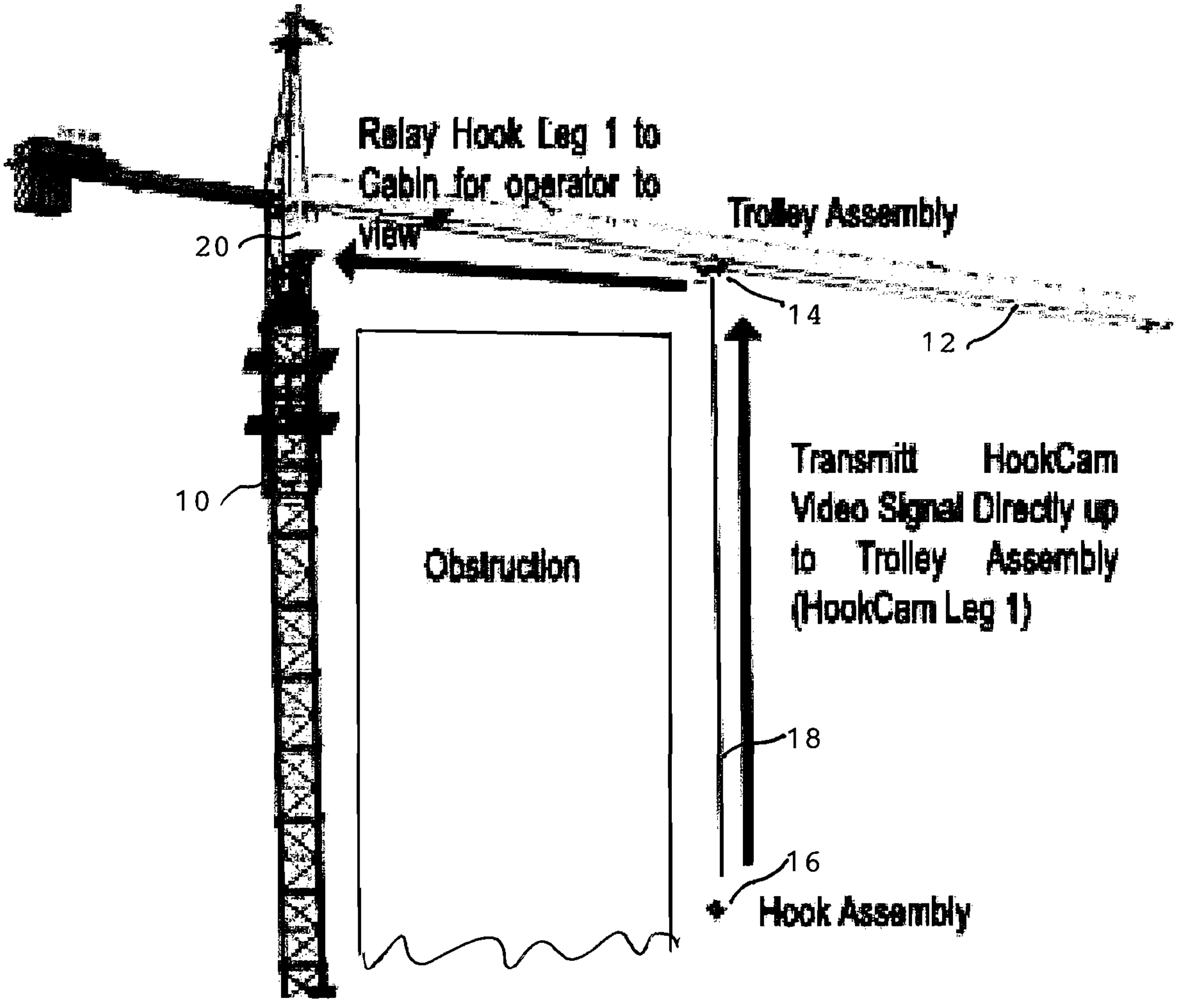
FIG. 4 illustrates the relay of the hook camera image signals from the hook device vertically to the trolley transmitting system, and from the trolley transmitting system horizontally to the operator cab so as to avoid interference from obstructions on the work site.

Referring first to FIG. 4, a preferred embodiment of the crane hook and trolley camera system of the present invention is used with a tower-type overhead crane having a vertical tower assembly 10 and a horizontal boom 12 elevated on the tower assembly 10 and provided with a movable trolley 14 from which the hook device 16 is suspended by cables 18. The pivoting movement of the boom in 360 degrees and the lifting and descending movement of the hook device 16 suspended on cables 18 from the trolley 14 are controlled by the crane operator sitting in an operator cabin 20 mounted on a pivoting part of the tower assembly at a proximal part of the boom 12. A hook camera system (described in detail below) is mounted on the hook device 16 and wirelessly transmits hook camera image signals in direct line-of-sight to the trolley 14 (referred to as HookCam Leg 1).

A receiver on the trolley 14 receives the HookCam Leg 1 signals, and a trolley transmitter wirelessly transmits the signals (referred to as Relay Hook Leg 1) toward the operator cab 20. With this configuration, the HookCam Leg 1 signals are always transmitted along a clear, line-of-sight path to the trolley camera system, and the Relay Hook Leg 1 signals are always relayed along a clear, line-of-sight path to the operator cabin 20. The relayed hook camera image signals are not blocked or interfered with even if the hook device is moved by the boom and trolley cables around a large obstruction (indicated by the outline in the figure). Preferably, the trolley also has a trolley camera for taking look-down visual images of the hook device from the trolley, and a second trolley transmitter for transmitting the trolley camera image signals to the operator cabin 20.

This invention provides a dual video camera system whereby the crane operator is given a unique close up view from the hook and an overview from the trolley on monitors in the cabin. The dual camera system is unique configured for reliable, unimpeded, and high data-rate wireless operation using a critical relay of the hook camera image signals from the ground. To avoid the limitations of hardwiring the sending of image signals from the hook to the cabin monitor, or potential interference with line-of-sight MW transmission or low data-rate with RF transmission to the cabin, the present invention utilizes the relay configuration to transmit the hook camera image signals toward the trolley in a vertical direction along the cables, and then both the hook camera image signals and the trolley camera image signals to the operator cabin along the boom.

The relay configuration is critical to reliable delivery of the hook camera image signals. It allows wireless transmission (not limited by hardwired cables) while strategically positioning the camera receiving and transmitting antennas to maintain clear line-of-sight paths between these components in X-Y-Z planes despite any movements of the load relative to the cabin. The wireless relay configuration enables the image signals from the hook camera, mounted strategically, safely, and snuggly on the hook, to be sent vertically along a clear path, then horizontally along a another clear path to the monitors in the cabin, instead of diagonally where they might encounter interference with intervening obstacles. The relay configuration enables tower crane operators to hit a pick with visual precision in any location on the ground and with any obstructions present, thereby greatly increasing safety of operation.

Figure 1A:
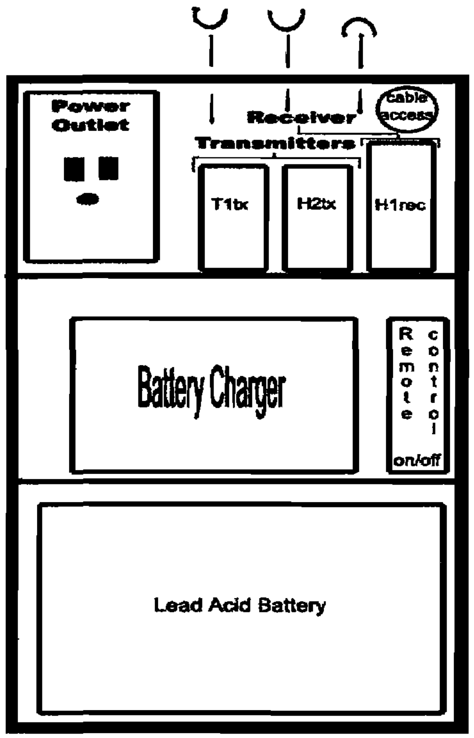
FIG. 1A shows a front schematic view of a trolley transmitting system for use in the present invention.
Figure 1B:
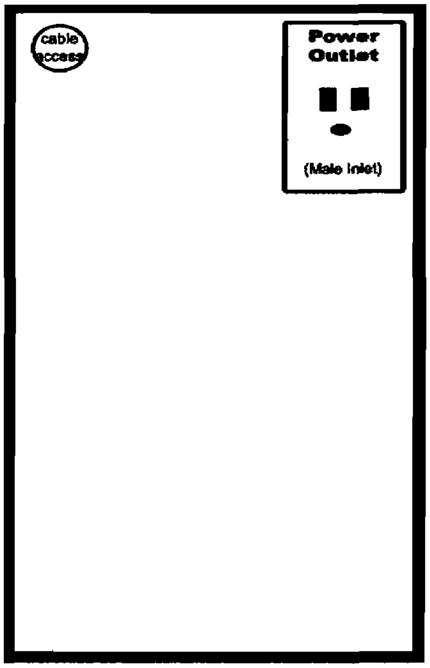
FIG. 1B shows a rear view thereof.

Referring to FIGS. 1A and 1B, the receiver/transmitter unit for the trolley camera system is shown having a hook receiver H1*rec* and associated receiving antenna, hook transmitter H2*tx* and associated transmitting antenna, and trolley transmitter T1*tx* and associated transmitting antenna. The unit includes an on-board battery to power the receiver/transmitter unit. When the crane is not in use (or the trolley is retracted to the position of the operator cabin), power can be supplied by a line via the power outlet to the battery charger to recharge the battery. Examples of the components of the receiver/transmitter unit may include a 12 v lead acid battery, 12 v battery charger, 2.4 GHz receiver (to receive the video feed from the hook), two 900 MHz transmitters (to send the hook and trolley video feeds to the cabin, and a remote control on/off switch to enable remote powering of the trolley housing components.

Figure 2:
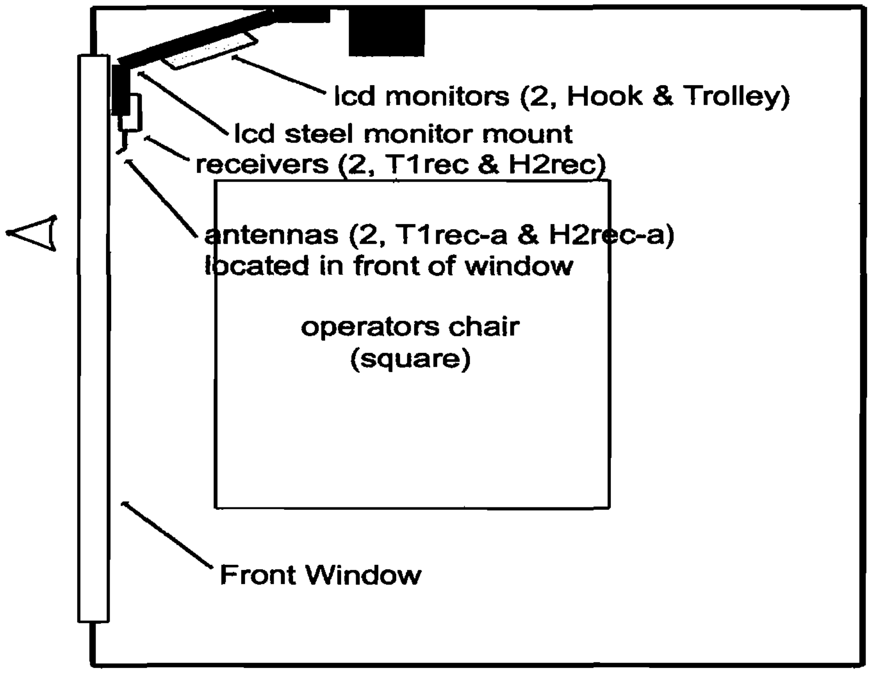
FIG. 2 shows a side schematic view of an operator cab in the present invention.

In FIG. 2, the operator cabin is shown having receiving antennas T1*rec-a* and H2*rec-a* located in front of the window to the operator cabin positioned in line-of-sight to the transmitting antennas of the receiver/transmitter unit for the trolley camera system. The received hook camera image signals are sent to a Hook monitor, and the received trolley camera image signals are sent to a Trolley monitor, both of which are mounted on a mount to be viewable by the operator sitting in the operator's chair. The wireless transmitters and receivers may operate in 900 MHz band with the Hook Cam on a different frequency from the Trolley Cam to avoid signal interference.

The cabin is the primary delivery point for live video feed to the monitors. The system can also be used to deliver video signals from other sources on the worksite, or to deliver the monitor signals to other locations off the work site, for example, by internet, cctv, intranet transmission of the signals to remote sites. A mount may be retrofitted in the cabin to hold the two monitors and two 900 MHz receivers. The monitors may be located on the right side of the cabin when facing the front window and adjustable with an adjustable mount. The crane operator may adjust the monitors for the best viewing angle. The receivers are ideally placed so that the attached omni-directional antennas are exposed in the front window of the crane and in line-of-sight of the transmitting directional antennas of the trolley camera system attached to the maintenance basket of the trolley. The monitors and ergonomic viewing angle allows the real time video feed to extend the crane operators view and allow for more efficient maneuvers and operations of the crane. With the Trolley Cam view, the operator knows when to slow the drop, speed the drop and accurately target the drop, avoiding building obstacles and personnel in the shadows. With the Hook Cam view, the operator can see pallets, workers, obstacles, etc. on the ground in the vicinity of the hook.

Figure 3A:
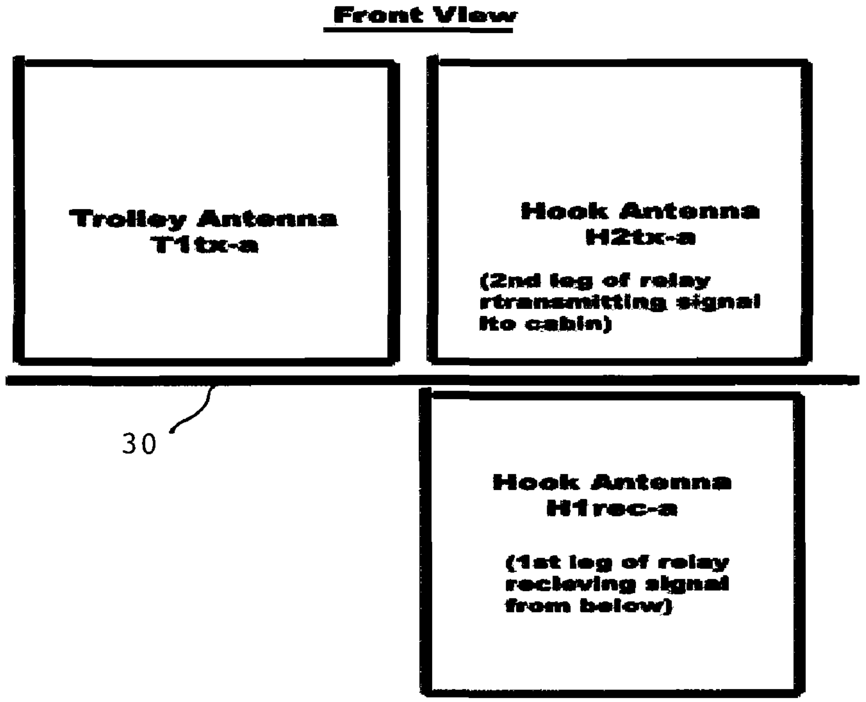
FIG. 3A shows a front schematic view of the trolley transmitting antenna and the hook receiving and transmitting antenna in the trolley transmitting system.
Figure 3B:
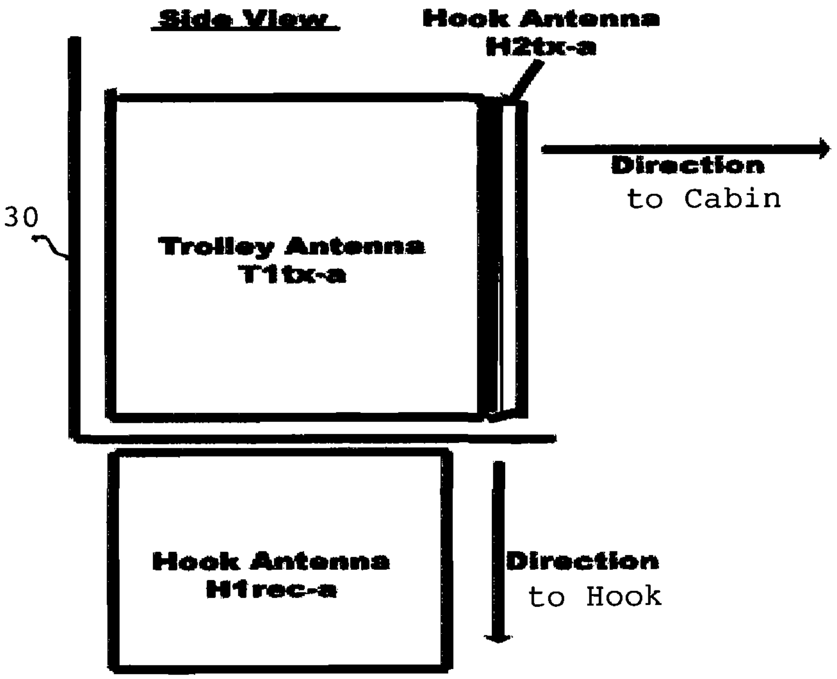
FIG. 3B shows a side schematic view thereof.

In FIGS. 3A and 3B, the mounting of the receiver/transmitter unit for the trolley camera system is shown mounted (from the maintenance basket) on the trolley (14 in FIG. 4) by mounting arm 30 holding the Hook receiving antenna H1*rec-a* so that it is exposed in a direction toward the hook (16 in FIG. 4), and the Trolley transmitting antenna T1*tx* and the Hook transmitting antenna H2*tx-a* so that it is exposed in a direction toward the operator cabin (20 in FIG. 4).

In the preferred embodiment, the above-described components constituting the Hook Cam and the Trolley Cam make up a wireless Video Image Delivery System for use by the operator of a tower crane. By their nature, the Trolley and Hook Cams operate in clear line-of-sight paths of an X-Y or X-Y-Z plane, despite the hook device and load changing positions often and quickly relative to the operator cabin. The wireless transmission paths employ the described relay configuration to change the diagonal line-of-sight from the operator to the load to avoid interference from any intervening obstructions. By use of this invention, the operator is able to maintain constant and close-up view of the hook device and load on the work site which would otherwise be impossible due to its constantly changing position, angle, obstructions, weather, and or distance. When in use this imaging/camera system provides the crane operator with an ability to view the worksite on a monitor from a distance and around obstacles.

Figure 5:
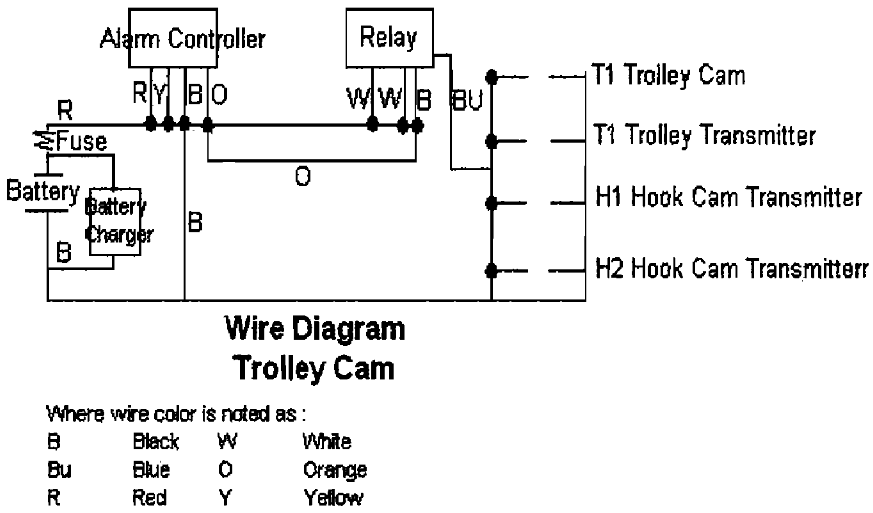
FIG. 5 shows a wiring diagram for the trolley camera system.

In FIG. 5, an example of a wiring diagram for the Trolley Cam is shown having the Trolley camera, Trolley Cam transmitter, Hook Cam receiver, and Hook Cam Relay transmitter powered by a battery system through a remote-controlled on/off switch.

Figure 6:
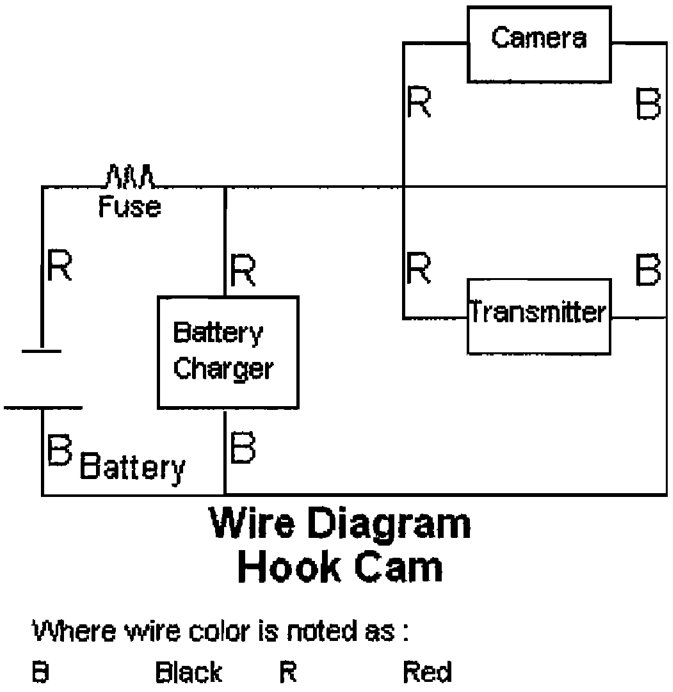
FIG. 6 shows a wiring diagram for the hook camera system.

In FIG. 6, an example of a wiring diagram for the Hook Cam is shown having the Hook camera and Hook Cam Leg 1 transmitter powered by a battery system.

Figures 7A, 7B:
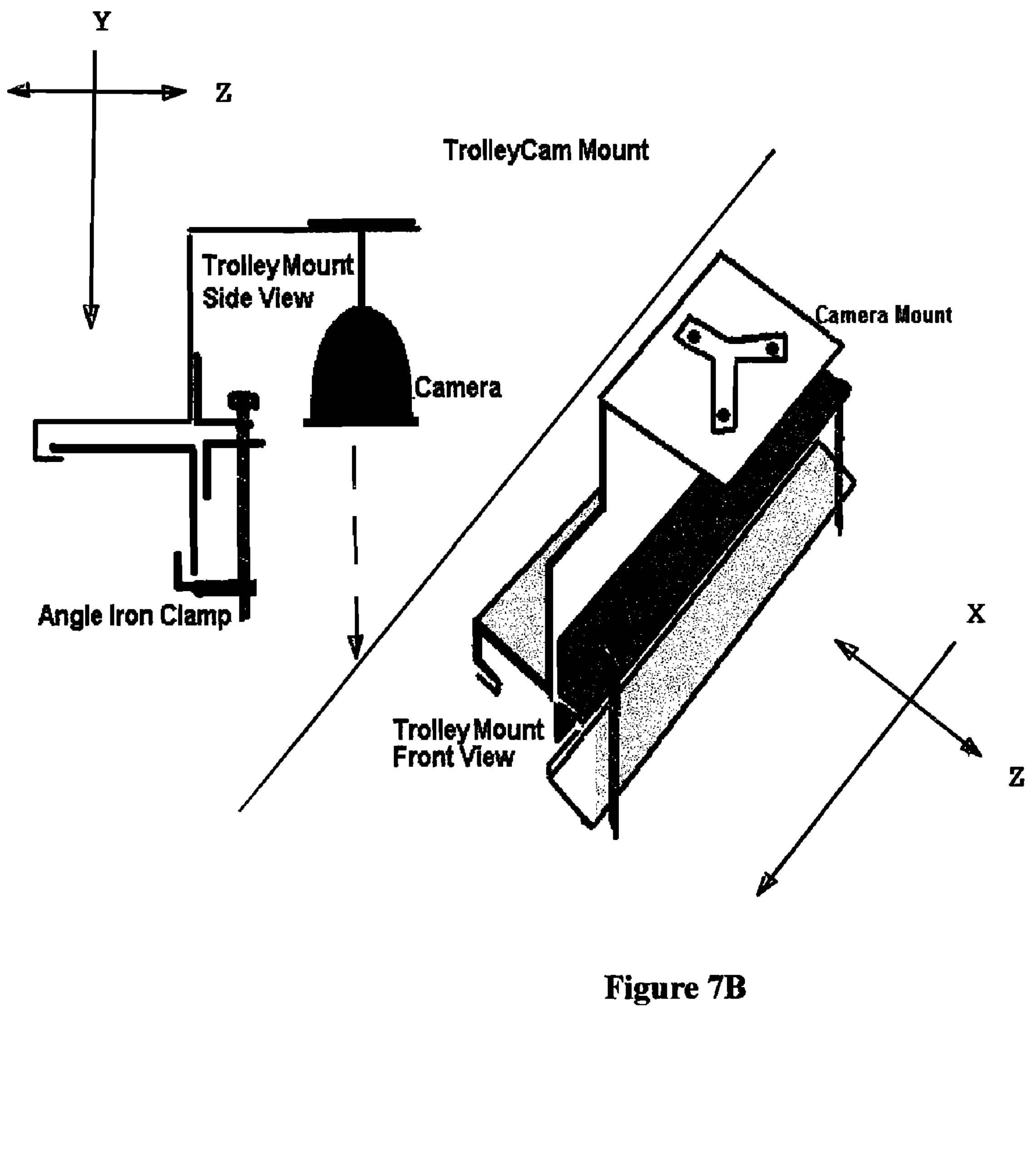
FIG. 7A shows a side schematic view of a trolley camera mount.
FIG. 7B shows a perspective view thereof.

In FIGS. 7A and 7B, an example of a trolley camera assembly is shown having an angle iron clamp for clamping onto the trolley maintenance basket which is typically located on an outward side the trolley that runs along a track on the boom. A camera mount for the Trolley camera is shown cantilevered to the outboard side of the trolley mount where it can maintain a line-of-sight view toward the hook device and the ground. The Trolley camera may be of the type that can be remote-controlled (by control signals transmitted from the operator cabin) to swivel, pan, and zoom in/out. The trolley mountings may be provided with shock absorbing layers to reduce vibration and enhance viewing. The feed of video signals from the Trolley camera is wired directly into the Trolley Cam transmitter T1*tx*. The Trolley Cam system is thus removed from the vibrating trolley environment and affixed by the angle iron clamp on the jib about 18 cm from the main part of the trolley. This location on the jib provides the camera a strategic downward view of the worksite and removes it from vibration. The camera is affixed to the underside of the jib by a clamp that is designed to hold the camera in the proper position. A rubber dampener is used to reduce vibration.

Figure 8:
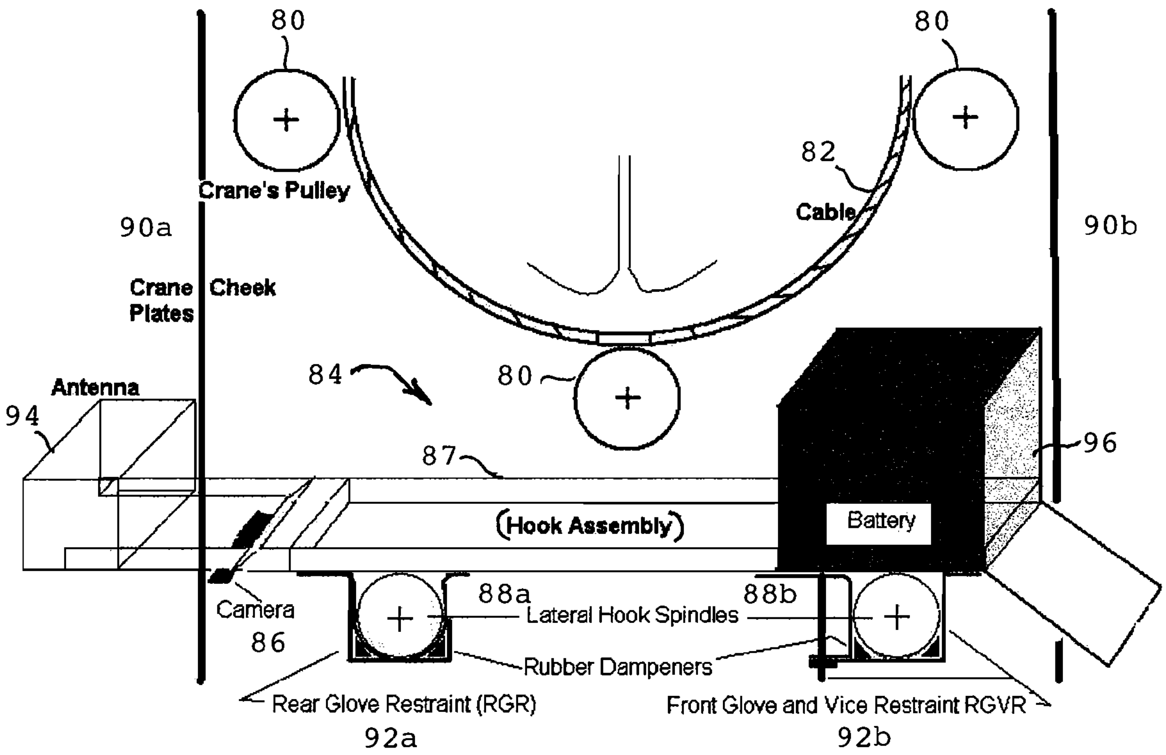
FIG. 8 shows an example of a hook camera system mounted on a hook.

In FIG. 8, an example of a Hook Cam mounting in the present invention is shown having provision for mitigating vibration, avoiding effects of contact with ground or building, avoiding damage from impact through connection to the hook plates, and being strategically set in place within the hook assembly for imaging near the ground and for alignment for transmission to its relay components. The physical integrity of the hook must be maintained due to the stresses placed upon it in normal use, thereby limiting the ability to simply drill and connect a hook assembly for the Hook Cam. Moving parts such as the crane's pulleys 80, hoist cable 82, and hook per se (not shown, out of plane of the figure) integral to the hook's primary function limit where the hook assembly can be attached. Therefore, the hook assembly 84 for the hook camera 86 has a longitudinal frame 87 that straddles two lateral hook spindles 88*a*, 88*b*, and fits laterally within the confines of the hook's two crane plates 90*a*, 90*b* forming cheek walls for the hook interior. This is accomplished by the measured fit of a Rear Glove Restraint 92*a* (RGR) which is a steel, U-shaped, 3-cornered custom fitted flange welded onto the 9-inch long, 2-inch diameter, rear spindle 88*a*. Welded to the front spindle 88*b* is a U-shaped, 4-cornered, fitting called the Front Glove & Vice Restraint 92*b* (RGVR) which has a vice-like bolt to restrain the hook assembly around the front spindle like a glove. This provides the platform and positioning for relay of the signal, alignment of the antenna, receiver and relay, alignment of the camera, and, most importantly, the safety of the assembly.

The camera and image are of little use if the degree and quantity of vibration degrades the picture quality. Because the crane boom is always in motion, vibration is a natural part of crane operation. The hook assembly must be insulated from the cause of vibration which is translated from the hook assembly to the hook mount assembly at the point of connection. Therefore, to mitigate vibration, the U-shaped fittings of the RGR and RGVR have rubber dampeners that serve as vibration mitigation linings which reduce the translation of vibration to the hook mount assembly.

The hook camera 86 is mounted on an angled flange on the interior side of the hook cheek wall and is recessed an exact distance to be beyond the reach of the pivoting hook, which upon impact can swing into the hook cheeks. The camera is thus recessed in an area where otherwise there would be no platform for connection of the camera. The hook assembly positions the camera away from the swing of the hook, and keeps it pointed and stably angled to capture a desired image of the hook in relation to the ground, while it is buffered from vibration.

The hook assembly protrudes to the outside of the crane plates for mounting the relay transmitter antenna 94 for the camera in line with the trolley's relay receiver aligned above the hook. The line of sight delivery of the signal from the hook transmitter 94 ensures non-interference delivery to the receiver on the trolley, where it is relayed to the receiver in the crane cabin and ultimately to the system monitors mounted in the cabin. Since the angle of signal transmission must be narrow to avoid interference from exigent signals or neighboring systems on other cranes, the hook mount must be engineered with the horizontal distance to provide for avoidance of the parent hook assembly and direct the signal to the relay device. An energy storage battery is also mounted on the hook assembly 84 at the opposite side for balance.

The hook camera may be of the type that can be remote-controlled (by control signals transmitted from the operator cabin) to swivel, pan, and zoom in/out. It can employ a 2.4

GHz transmitter (H1$tx$) and antenna (H1$tx$-$a$). The antenna (H1$tx$-$a$) is a directional antenna directed straight up to the trolley receiving antenna (H1$rec$-$a$). Because the tower-crane trolley camera assembly is always located substantially in direct vertical line above the hook, the video transmission always remains in line-of-sight.

The typical overhead crane hook weighs approximately 2 tons and is not intended to carry a camera. The hook can be run into the ground as well as the sides of buildings and/or other solid objects, and therefore the Hook Cam provides the operator with a view for safely maneuvering the hook that is not currently provided. The hook also contains moving items such as the cable pulley, the cable, and the hook itself swivels. The hook camera assembly is designed to fit within the hook plates and is positioned so that the Hook Cam Leg 1 transmitter extends from the hook and maintains a clear transmission path to the trolley relay above. The hook assembly location is positioned within the hook cheek plates without interfering with the hook's internal moving parts. The location of the mount between the cheek plates of the hook protects the hook assembly and components from damage. It is mounted onto a rubber vibration dampener to reduce vibration and enhance viewing.

The two-ton hook twists or spins as it drops. The alignment with the relay above can be defeated if the hook rack is recessed because the signal may be blocked by the hook assembly. Reliable delivery of the signal requires the transmitter portion of hook cam rack to extend out from the hook to assure consistency of the signal to the relay. The Hook transmitter extends six centimeters beyond the cheek plates of the hook so that the directional transmitter is not compromised by possible interference of the hook should the hook spin. The Hook Cam rack is by necessity a combination of slim vertical profile, narrow horizontal width, and heavy gauge welded steel. It must fit in the confined space of the sandwich of the crane pulley assembly above and the hook axle cover plate below. Clamps may be used so as not to compromise the structural integrity of the hook cheek plates with drilled screw holes.

The Trolley and Hook Cam systems may be powered by gel cell batteries, each supplied with a recharging system. Because the jib or boom is accessed most often only at nightly close of operations, it is fitted with a remote on/off switch as a convenience. The Trolley Cam DC battery system may be recharged with 110V power supplied from the cabin power system. The Trolley cam may be charged nightly. Its recharging system is fed by a re-charge cord that plugs in to the crane electrical system in the cabin to charge overnight. The Trolley Cam power system may be designed to last four days before a charge is necessary. The Hook Cam power charging system is matched to power consumption of the Hook Cam where the battery life may be one week, thus allowing the system to be charged on weekends. Alternatively, the systems may be powered by a mechanically-powered generator drawing energy from the spin of the trolley pulleys in a magnetic field.

Further improvements to the Hook and Trolley Cam systems may be made by developing an efficient ambient energy generator to draw energy from the spin of the trolley pulleys in a magnetic field. This would allow the Hook and Trolley cameras to remain powered just by the operation of the hook/trolley pulley system. A pick locator may be designed as a digital compass and digital marker to "mark" location of a drop-off or pick-up by the hook. This system would store work data on the movements of the hook and trolley on various projects. The data may be transmitted by interleaving or injecting them in with the video signals. Proximity sensors may also be provided on the hook and have its warning signals transmitted by the relay system to the cabin to warn the operator against possible collision.

It is understood that many modifications and variations may be devised given the above description of the principles of the invention. It is intended that all such modifications and variations be considered as within the spirit and scope of this invention, as defined in the following claims.

The invention claimed is:

1. A crane camera system having a trolley camera system adapted to be mounted on a trolley of a crane comprising:

a hook camera system mounted on a hook device including a hook camera:

a trolley signal receiver for receiving hook camera image signals transmitted from a hook camera image signal transmitter on a hook device suspended by cables from the trolley, and a trolley signal transmitter for wirelessly transmitting the received hook camera image signals in a direction along a boom, the trolley is mounted on toward an operator cabin located at a proximal part of the boom, wherein the trolley camera system is supplied with power from an ambient energy generator that draws enemy from the spin of the trolley pulleys in a magnetic field.

2. A crane camera system according to claim 1, further comprising:

a cabin visual display system having a cabin receiver for receiving the hook camera image signals relayed by the trolley transmitter on the line-of-sight along the boom from the trolley, and a display unit for converting the received hook camera image signals into a visual display for an operator in the cabin of conditions in the vicinity of the hook device.

3. A crane camera system according to claim 2, wherein the trolley camera system includes a trolley camera for taking look-down visual images of the hook device from the trolley, and a second trolley transmitter for transmitting trolley camera image signals on the line-of-sight toward the operator cabin in tandem with the relayed hook camera image signals for a second visual display for the operator in the cabin of look-down images of the hook device from the trolley.

4. A crane camera system according to claim 2, wherein the hook camera system employs a different band of wireless transmission frequency from the trolley camera system.

5. A crane camera system according to claim 4, wherein the hook camera system employs a 2.4 GHz transmission band.

6. A crane camera system according to claim 4, wherein the trolley camera system employs a 900 MHz transmission band.

7. A crane camera system according to claim 1, wherein the trolley camera system further comprises a trolley camera for taking look-down visual images of the hook device from the trolley, and a second trolley transmitter for transmitting trolley camera image signals toward the operator cabin in tandem with the relayed hook camera image signals.

8. A crane camera system according to claim 1, wherein the transmission of camera image signals is obtained by wireless line-of-sight transmission.

9. A crane camera system according to claim 1, wherein the trolley camera system employs a different band of wireless transmission frequency from the hook camera image signal transmitter.

10. A crane camera system according to claim 1, wherein the trolley signal receiver and trolley signal transmitter are used to transmit other types of data signals sent from the hook camera image signal transmitter to be relayed to the operator cabin.

11. A crane camera system according to claim 1, wherein the trolley camera system is adapted to be mounted on an outboard maintenance basket on the trolley.

* * * * *

UNITED STATES PATENT AND TRADEMARK OFFICE

CERTIFICATE OF CORRECTION

PATENT NO. : 7,656,459 B2
APPLICATION NO. : 11/379539
DATED : February 2, 2010
INVENTOR(S) : Chris Catanzaro et al.

It is certified that error appears in the above-identified patent and that said Letters Patent is hereby corrected as shown below:

Title Page,

Item (75) Inventors should read:

--Chris Catanzaro, Oahu, HI (US); Rudolph R. Mician, Tampa, FL (US)--.

Signed and Sealed this
Seventh Day of February, 2012

David J. Kappos
*Director of the United States Patent and Trademark Office*